United States Patent
Dudar et al.

(10) Patent No.: US 9,512,662 B1
(45) Date of Patent: Dec. 6, 2016

(54) ICE BREAKING STRATEGY FOR VEHICLE SIDE WINDOWS

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/714,193

(22) Filed: May 15, 2015

(51) Int. Cl.
| | | |
|---|---|---|
| *E05F 15/71* | (2015.01) | |
| *E05F 15/695* | (2015.01) | |
| *H02P 7/00* | (2016.01) | |

(52) U.S. Cl.
CPC ............ *E05F 15/71* (2015.01); *E05F 15/695* (2015.01); *H02P 7/00* (2013.01); *E05Y 2900/55* (2013.01)

(58) Field of Classification Search
CPC ............ E05F 15/71; E05F 15/696; H02P 7/00
See application file for complete search history.

(56) References Cited

U.S. PATENT DOCUMENTS

| | | | | |
|---|---|---|---|---|
| 4,387,973 | A * | 6/1983 | Martin | 359/507 |
| 4,833,373 | A * | 5/1989 | Doi et al. | 318/114 |
| 5,136,425 | A * | 8/1992 | Fujie et al. | 359/507 |
| 5,155,625 | A * | 10/1992 | Komatsu et al. | 359/512 |
| 5,170,288 | A * | 12/1992 | Imaizumi et al. | 359/507 |
| 5,475,530 | A * | 12/1995 | Fujie et al. | 359/512 |
| 5,729,104 | A | 3/1998 | Kamishima et al. | |
| 5,912,538 | A | 6/1999 | Turner | |
| 6,404,158 | B1 * | 6/2002 | Boisvert et al. | 318/469 |
| 7,084,553 | B2 * | 8/2006 | Ludwiczak | 310/328 |
| 7,459,831 | B2 | 12/2008 | Ludwiczak | |
| 7,770,453 | B2 * | 8/2010 | Ludwiczak | 73/583 |
| 8,087,297 | B2 * | 1/2012 | Ludwiczak | 73/584 |
| 8,517,313 | B2 * | 8/2013 | Gornik | 244/134 R |
| 2002/0101210 | A1 * | 8/2002 | Boisvert et al. | 318/469 |
| 2010/0031972 | A1 * | 2/2010 | Royer et al. | 134/1 |

* cited by examiner

*Primary Examiner* — Jerry Redman
(74) *Attorney, Agent, or Firm* — James P. Muraff; Neal, Gerber & Eisenberg LLP (57) ABSTRACT

Described herein is a vehicle side window system and method for implementing an ice breaking strategy. The ice breaking strategy receives and analyzes sensor information from one or more environmental sensors to determine when to preemptively implement an ice breaking routine. The ice breaking strategy is also capable of monitoring one or more components of the vehicle side window system to determine when to cease the ice breaking routine.

17 Claims, 6 Drawing Sheets

ICE BREAKING STRATEGY FOR VEHICLE SIDE WINDOWS

BACKGROUND

This disclosure generally relates to a vehicle including components for implementing an ice breaking strategy for vehicle side windows.

Under certain conditions, ice has been found to form on vehicle side windows. Requiring a driver or passenger to leave the comforts of the vehicle to scrape off the ice formed on the outside of the vehicle side window is a nuisance for the driver or passenger as the outside conditions are likely to be cold and uncomfortable. Further, solutions for breaking up the ice from the inside by operating the vehicle side windows manually may not be sufficient to break up substantial ice buildup.

SUMMARY

This application is defined by the appended claims. The description summarizes aspects of embodiments of the disclosure and should not be used to limit the claims. Other implementations are contemplated in accordance with the techniques described herein, as will be apparent upon examination of the following drawings and description, and such implementations are intended to be within the scope of this disclosure.

Exemplary embodiments provide a vehicle including components configured to implement an ice breaking strategy for vehicle side windows. The ice breaking strategy obtains sensor information from one or more environmental sensors of the vehicle, and determines when to initiate a preemptive ice breaking routine based on the obtained sensor information. The sensor information may be obtained while the vehicle engine is not on, while vehicle electrical components are not in an on state due to an ignition setting, or at some other time when a passenger is not seated within the vehicle. For example, the sensor information may be analyzed to determine whether an ice forming condition exists outside of the vehicle. By monitoring the sensor information for environmental conditions that may allow for ice to form on the vehicle side windows, the ice breaking strategy may then implement an ice breaking routine before ice is allowed to form on the vehicle side windows. Implementing the preemptive ice breaking routine is advantageous to prevent significant ice formation on the vehicle side window, where a power window motor may not be able to move a door window to break off significant ice formation.

According to some embodiments, a vehicle comprising a sensor configured to sense an environmental condition, a motor configured to move a window, and a control unit is disclosed. The control unit may be configured to operate in an off state before receiving a wake up signal, receive the wake up signal enabling the control unit to receive sensor information from the sensor, and control an ice breaking routine based on the sensor information.

According to some embodiments, a vehicle comprising a sensor configured to sense an environmental condition, a motor configured to move a window, and a control unit is disclosed. The control unit may be configured to receive sensor information from the sensor while the control unit is in an off state, analyze the sensor information, determine whether an ice breaking condition is satisfied based on the analysis, and control an ice breaking routine based on the determination.

BRIEF DESCRIPTION OF THE DRAWINGS

For a better understanding, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION

While the invention may be embodied in various forms, there are shown in the drawings, and will hereinafter be described, some exemplary and non-limiting embodiments, with the understanding that the present disclosure is to be considered an exemplification and is not intended to limit the features described herein to the specific embodiments illustrated. Not all of the components described in this disclosure may be required, however, and some implementations may include additional, different, or fewer components from those expressly described in this disclosure. Variations in the arrangement and type of the components may be made without departing from the spirit or scope of the claims as set forth herein.

Under certain environmental conditions, vehicle side windows may freeze or form ice over portions of the vehicle side windows. When this occurs, the vehicle side windows may become stuck and unable to move up or down. For example, the vehicle side window may be prevented from moving from a closed position to an open position, or moving from an open position to a closed position, when the vehicle side window is frozen or has ice formed over portions of the vehicle side window.

In power window applications, a passenger may try to break up ice formed on the vehicle side window by attempting to actuate the vehicle side window up and/or down. However, when the ice formed on the vehicle side window is significant, a torque force available from a power window motor may not be sufficient to break the ice built up on the vehicle side window.

It follows that the current disclosure describes a vehicle side window system and method for implementing an ice breaking strategy that preemptively prevents ice formation on the vehicle side windows. The ice breaking strategy involves receiving sensor information from one or more environmental sensors that are included as part of a vehicle system. The different types of environmental sensors and sensor information that may be utilized by the vehicle side window system are described in more detail herein. The sensor information may then be analyzed to determine whether an ice breaking condition is satisfied. If the ice breaking condition is determined to be satisfied based on the sensor information, an ice breaking routine is implemented. The ice breaking routine is described in more detail herein. If the ice breaking condition is not satisfied, the vehicle side window system may revert to receiving sensor information. After, or in some embodiments during, implementing the ice breaking routine, the vehicle side window system may monitor for an ice broken condition. The ice broken condition is described in more detail herein. If the ice broken condition is determined to be satisfied, the ice breaking routine is ceased. If the ice broken condition is determined not to be satisfied, the ice breaking routine may be continued, or started up again.

Figure 1:
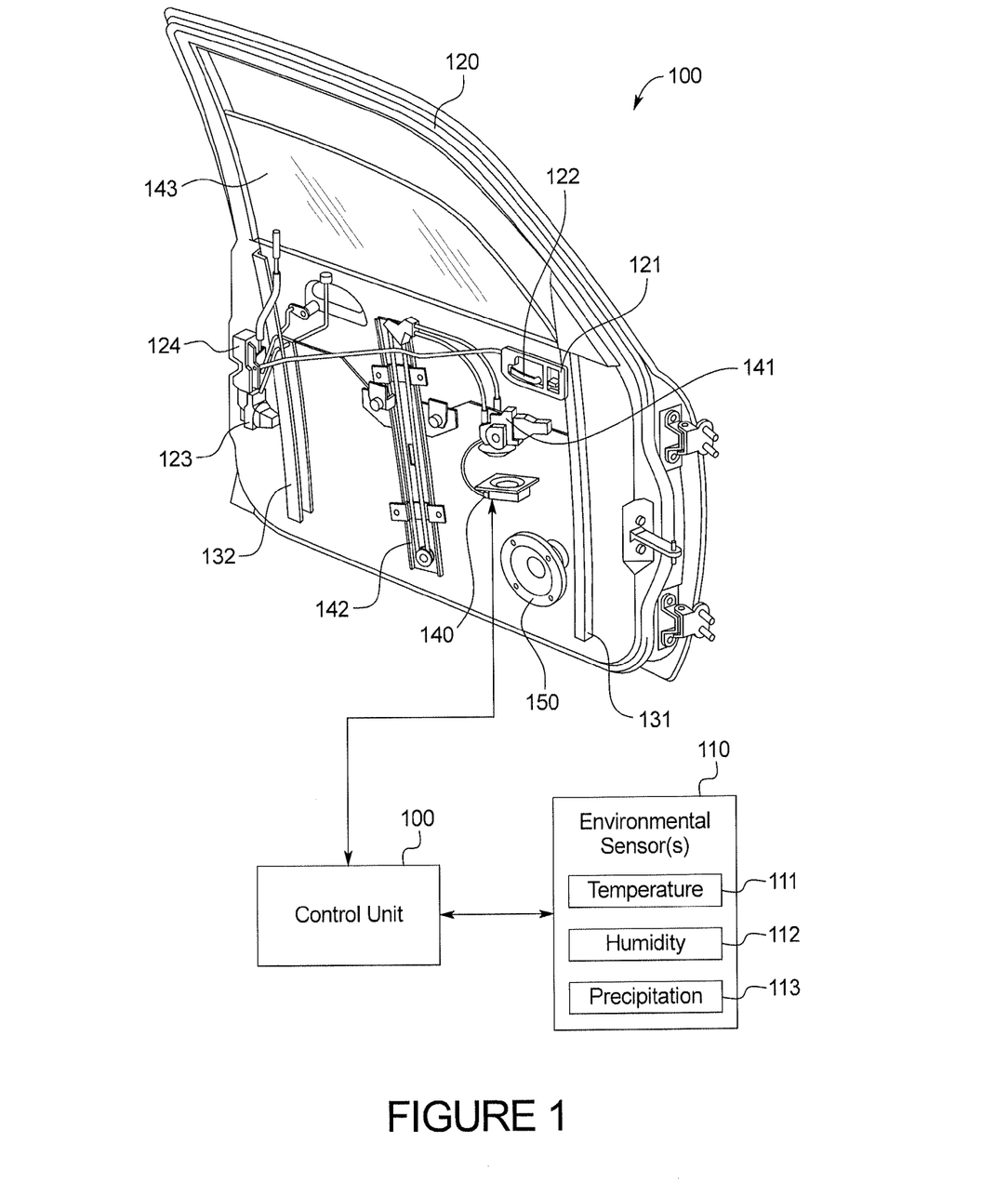
FIG. 1 illustrates an exemplary vehicle side window system.

FIG. 1 illustrates a vehicle side window system 100 according to some embodiments. The vehicle side window system includes a control unit 101 in communication with environmental sensors 110, where control unit 101 may communicate with environmental sensors 110 via either wired or wireless communication protocols. Environmental sensors 110 may include one or more of a temperature sensor 111 (e.g., ambient air temperature sensor), a humidity sensor 112, and a precipitation sensor 113. Control unit 101 may be, for example, a body control module (BCM), a power-train control module (PCM), or another computing device comprised of a processor and a vehicle memory configured to control one or more components of the vehicle side window system 100. Control unit 101 may also be configured to send and/or receive information from one or more components of the vehicle side window system 100. Although control unit 101 is depicted as receiving sensor information from environmental sensors 110 directly, according to some embodiments control unit 101 may receive the sensor information from another computing device (not specifically illustrated), where the other computing device receives the sensor information from the environmental sensors 110 directly via either a wired or wireless connection protocol.

Vehicle side window system 100 also includes automatic lock/unlock switch 121, door handle 122, power door actuator 123, latch 124, and speaker 150. A passenger's control of automatic lock/unlock switch 121 will control power door actuator 123 to engage or disengage latch 124 for locking and unlocking door 120. Vehicle side window system 100 also includes a window assembly including first window channel 131, second window channel 132, power window switch 140, window motor 141 (e.g., a DC motor), window regulator 142, and window 143. A passenger's control of power window switch 140 will control window motor 141 to rotate in a window-down direction or window-up direction. When window motor 141 is controlled to rotate in the window-down direction, window regulator 142 is also rotated in a window-down direction to bring window 143 down and towards a window-down position.

When window motor 141 is controlled to rotate in the window-up direction, window regulator 142 is also rotated in a widow-up direction to bring window 143 up towards a window-up position. As window 143 travels up and down, first window channel 131 and second window channel 132 help guide window 143 along a set path. In addition to controlling movement of window 143 based on the passenger's input to power window switch 140, movement of window 143 may be controlled by control unit 101 according to the ice breaking strategy described herein.

Figure 2:
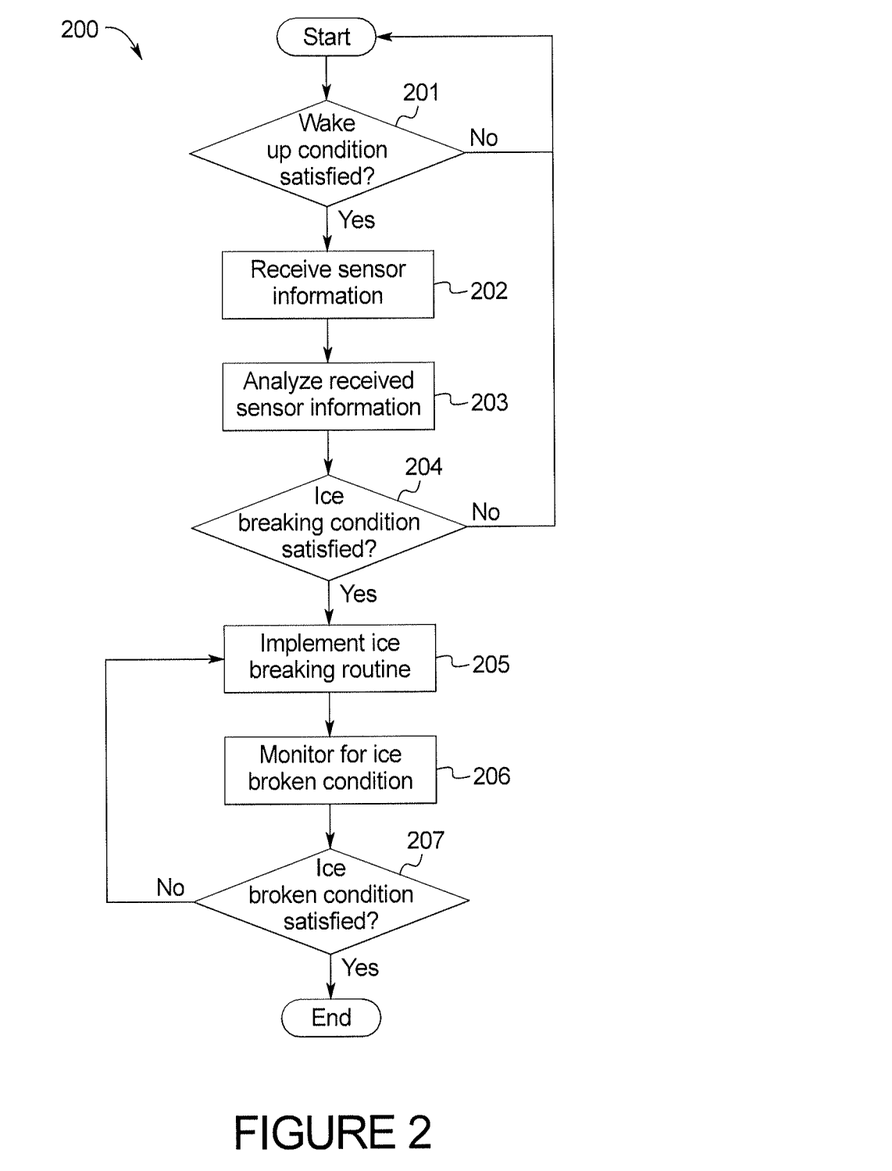
FIG. 2 illustrates a flow chart describing a process for implementing an ice breaking strategy, according to some embodiments.

FIG. 2 illustrates flow chart 200 describing an ice breaking strategy process. The ice breaking strategy process determines when to implement an ice breaking routine, and also determines when to cease the ice breaking routine.

At 201, a determination is made whether a wake up condition is satisfied. This determination at 201 may be included in the ice breaking strategy process when the vehicle system, including the control unit 101, is otherwise in an off, or less than fully functional, state. The off state may correspond to a state where the vehicle ignition has not been engaged to turn on the vehicle engine or has not been engaged to turn on one or more electrical systems of the vehicle. While the vehicle is in such an off state, control unit 101 may receive a wake up signal. The wake up signal may be received by control unit 101 when one or more buttons (e.g., unlock button, lock button, truck open button, emergency alert button) on a vehicle key FOB associated to the vehicle is pressed and a corresponding FOB signal is received by the vehicle. The FOB signal may be routed to be received by control unit 101 at, for example, a dedicated wake pin of control unit 101. Receiving the FOB signal by control unit 101 will result in the wake up condition of 201 being satisfied.

In addition or alternatively, an ice breaking routine time may be previously set such that the wake up condition of 201 is satisfied when the ice breaking routine time is satisfied. For example, if the ice breaking routine time is set to be a specific time of day (e.g., 2:00 a.m.), the wake up condition of 201 may be satisfied when control unit 101 determines a current time is equal to the specific time of day identified in the ice breaking routine time. In another example, if the ice breaking routine time is a specific time interval (e.g., 6 hour interval), the wake up condition of 201 may be satisfied when control unit 101 determines a length of time since the ice breaking routine has last been implemented equals the specific time interval identified in the ice breaking routine time.

If the wake up condition is determined not to be satisfied at 201, the ice breaking strategy process reverts back to a starting point. If the wake up condition is determined to be satisfied at 201, at 202, control unit 101 receives sensor information from one or more environmental sensors 110. For example, control unit 101 may receive ambient air temperature readings sensed by temperature sensor 111, humidity readings sensed by humidity sensor 112, and precipitation readings sensed by precipitation sensor 113.

At 203, the received sensor information is analyzed by control unit 101. For example, control unit 101 may compare the ambient air temperature reading sensed by temperature sensor 111 against a predetermined ice forming temperature value. Control unit 101 may also compare the humidity reading sensed by humidity sensor 112 against a predetermined ice forming humidity value. Control unit 101 may also compare precipitation reading sensed by precipitation sensor 113 against a predetermined ice forming precipitation value. In addition or alternatively, control unit 101 may analyze one or more of the ambient air temperature reading, humidity reading, and/or precipitation reading to compare the analyzed readings information from environmental sensors 110 to a predetermined ice forming condition. The predetermined ice forming temperature value, predetermined ice forming humidity value, predetermined ice forming precipitation value, and predetermined ice forming condition information may be stored on a vehicle memory accessible by control unit 101.

At 204, control unit 101 may determine whether an ice breaking condition is satisfied. For example, the ice breaking condition may be satisfied when the ambient air temperature reading is determined to be lower than the predetermined ice forming temperature value. In addition or alternatively, the ice breaking condition may be satisfied when the humidity reading is above, or below, the predetermined ice forming humidity value. In addition or alternatively, the ice breaking condition may be satisfied when the precipitation reading is above the predetermined ice forming precipitation value. In addition or alternatively, the ice breaking condition may be satisfied when the analyzed readings information from environmental sensors 110 is determined to satisfy the predetermined ice forming condition.

If the ice breaking condition is not satisfied at 204, the ice breaking strategy process may revert back to a starting point. If the ice breaking condition is satisfied at 204, control unit 101 may implement the ice breaking routine at 205. The ice breaking routine may include pulsing window motor 141 between the window-down direction and window-up direction at a high torque to move window 143 in a rapid motion. The rotational speed of window motor 141 during the ice breaking routine may be faster, or slower, than the rotational speed of window motor 141 during a normal passenger operational mode, as described herein. By rotating window motor 141 at the high torque during the ice breaking routine, ice may be prevented from forming on window 143. By rotating window motor 141 at the high torque during the ice breaking routine, thin amounts of ice may be proactively broken off window 143. The ice breaking routine at 205 may be implemented for a set number of window motor 141 pulse cycles, a predetermined time period, or until an ice broken condition is satisfied at 207.

Figure 4:
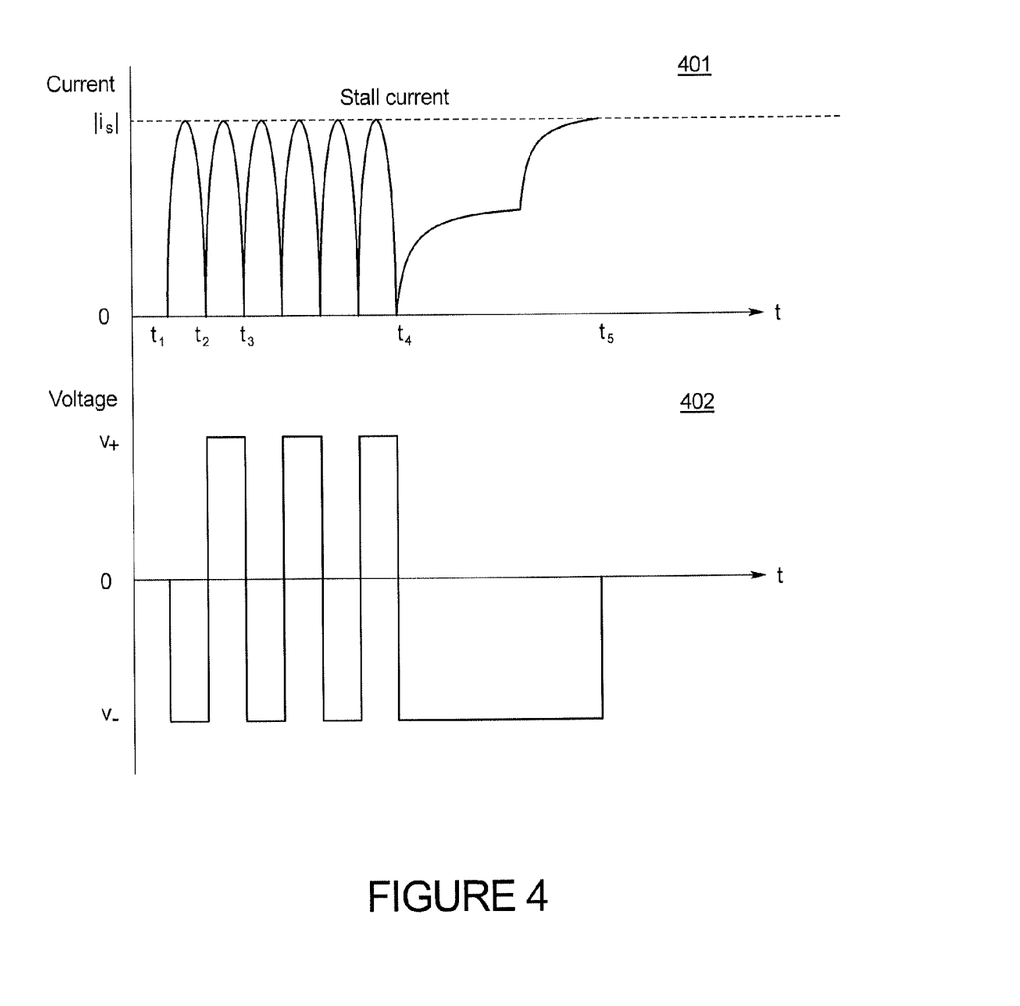
FIG. 4 illustrates a combined current and voltage graph plotting exemplary current and voltage values during the implementation of the ice breaking strategy, according to some embodiments.

At 206, control unit 101 monitors for an ice broken condition. The monitoring at 206 may be implemented while the ice breaking routine is running, or after the ice breaking routine has, at least temporarily, ceased. The monitoring at 206 may include control unit 101 monitoring a motor current or motor voltage of window motor 141. For example, FIG. 4 illustrates a first graph 401 plotting motor current against time, and a second graph 402 plotting motor voltage against time, where the time for the first graph 401 and the second graph 402 are the same. From time $t_1$ to $t_2$ control unit 101 controls window motor 141 to attempt to rotate in the window-down direction as depicted by the negative voltage from $t_1$ to $t_2$. However, based on the motor current hitting the stall current between $t_1$ to $t_2$, control unit 101 is able to determine that window motor 141 may be stuck. From $t_2$ to $t_3$, control unit 101 controls window motor 141 to attempt to rotate in the window-up direction as depicted by the positive voltage from $t_2$ to $t_3$. However, based on the motor current hitting the stall current between $t_2$ to $t_3$, control unit 101 is able to determine that window motor 141 may still be stuck. The control unit 101 may pulse the window motor 141 until time $t_4$ where the motor current is detected not to reach the stall current as in previous pulsating periods. Each pulsating period may last for a same length of time. Detecting the stall current is not reach as in previous pulsating periods following time $t_4$ may correspond to control unit 101 determining that the ice broken condition has been satisfied at 207. Alternatively, control unit 101 may detect motor voltage lasting at the negative voltage following time $t_4$ and determine that the ice broken condition has been satisfied at 207.

Figure 5:
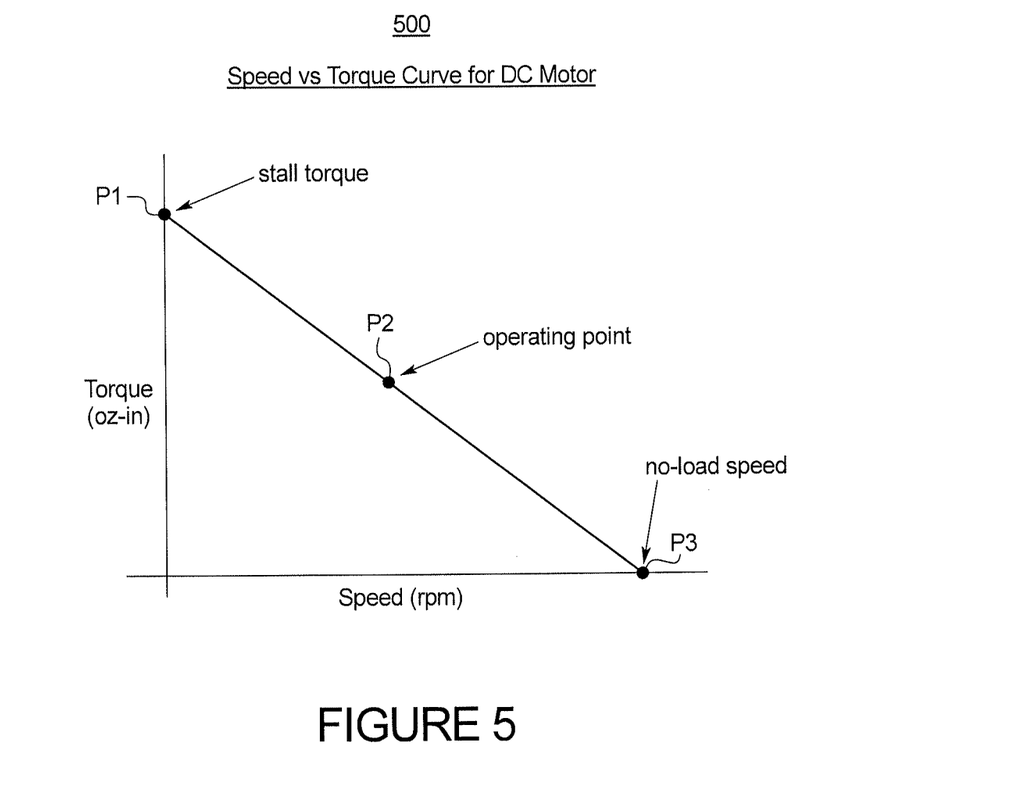
FIG. 5 illustrates a graph plotting exemplary torque and speed values for a window motor, according to some embodiments.

In addition or alternatively, control unit 101 may reference a speed vs. torque curve as illustrated by third graph 500. Control unit 101 may monitor a torque of window motor 141 to determine window motor 141 is in a stuck state when a high torque and low speed is detected, as illustrated by point P1. Control unit 101 may monitor the torque of window motor 141 to determine window motor 141 is in a non-stuck (i.e., no load) state when a low torque and high speed is detected, as illustrated by point P3. Control unit 101 may monitor the torque of window motor 141 to determine window motor 141 is in an operational state when a torque between point P1 and P3 is detected along with a speed between P1 and P3 is detected. Detecting the window motor 141 is in an operational state enables control unit 101 to determine the ice broken condition has been satisfied at 207.

If control unit 101 does not determine the ice broken condition has been satisfied at 207, the ice breaking strategy process may revert to implementing the ice breaking routine at 205.

Figure 3:
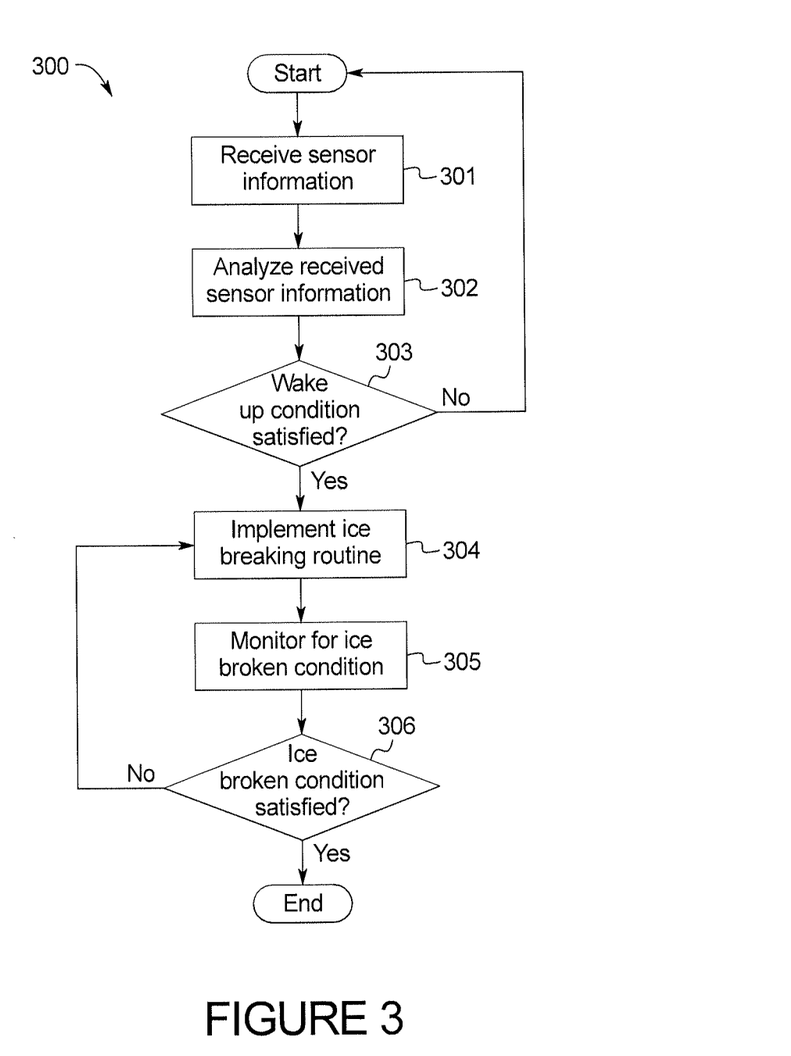
FIG. 3 illustrates a flow chart describing a process for implementing an ice breaking strategy, according to some embodiments.

FIG. 3 illustrates flow chart 300 describing an ice breaking strategy process where one or more of environmental sensors 110 (e.g., temperature sensor 111, humidity sensor 112, or precipitation sensor 113) are coupled to a Hot At All Times (HAAT) circuit that allows one or more environmental sensors 110 to be active and sensing environmental conditions even while the vehicle is in the off state. The ice breaking strategy process determines when to implement an ice breaking routine, and also determines when to cease the ice breaking routine.

According to such embodiments, at 301 one or more environmental sensors 110 may be active to receive sensor information, as described herein with respect to flow chart 200. For example, control unit 101 may receive ambient air temperature readings sensed by temperature sensor 111, humidity readings sensed by humidity sensor 112, and precipitation readings sensed by precipitation sensor 113.

At 302, sensor information received from the one or more active environmental sensors 110 may be analyzed. For example, control unit 101 may compare an ambient air temperature reading sensed by temperature sensor 111 against a predetermined wake up condition temperature value. Control unit 101 may also compare a humidity reading sensed by humidity sensor 112 against a predetermined wake up condition humidity value. Control unit 101 may also compare a precipitation reading sensed by precipitation sensor 113 against a predetermined wake up condition precipitation value. In addition or alternatively, control unit 101 may analyze one or more of the ambient air temperature reading, humidity reading, and/or precipitation reading to compare the analyzed sensor readings information from environmental sensors 110 to a predetermined wake up condition. The predetermined wake up condition temperature value, predetermined wake up condition humidity value, predetermined wake up condition precipitation value, and predetermined wake up condition information may be stored on a vehicle memory accessible by control unit 101.

At 303, control unit 101 may determine whether the wake up condition is satisfied. For example, the wake up condition may be satisfied when the ambient air temperature reading is determined to be lower than the predetermined wake up condition temperature value. In addition or alternatively, the wake up condition may be satisfied when the humidity reading is above, or below, the predetermined wake up condition humidity value. In addition or alternatively, the wake up condition may be satisfied when the precipitation reading is above the predetermined wake up condition precipitation value. In addition or alternatively, the wake up condition may be satisfied when the analyzed sensor readings information from environmental sensors 110 is determined to satisfy the predetermined wake up condition. In addition or alternatively, the wake up condition may be satisfied when a FOB signal is received at control unit 101 in addition to any one or more of the other wake up condition satisfying conditions described herein.

If the wake up condition is not satisfied at 303, the ice breaking strategy process may revert back to a starting point. If the ice breaking condition is satisfied at 303, control unit 101 may implement the ice breaking routine at 304. The ice breaking routine at 304 may be the same as the ice breaking routine implemented with reference to flow chart 200.

At 305, control unit 101 monitors for an ice broken condition. The monitoring for the ice broken condition at 305 may be the same as the monitoring for the ice broken condition implemented with reference to flow chart 200.

At 306, control unit 101 determines whether the ice broken condition is satisfied. The determination of whether the ice broken condition is satisfied at 306 may be the same as the determination of whether the ice broken condition is satisfied implemented with reference to flow chart 200.

If control unit 101 does not determine the ice broken condition has been satisfied at 306, the ice breaking strategy process may revert to implementing the ice breaking routine at 304.

Figure 6:
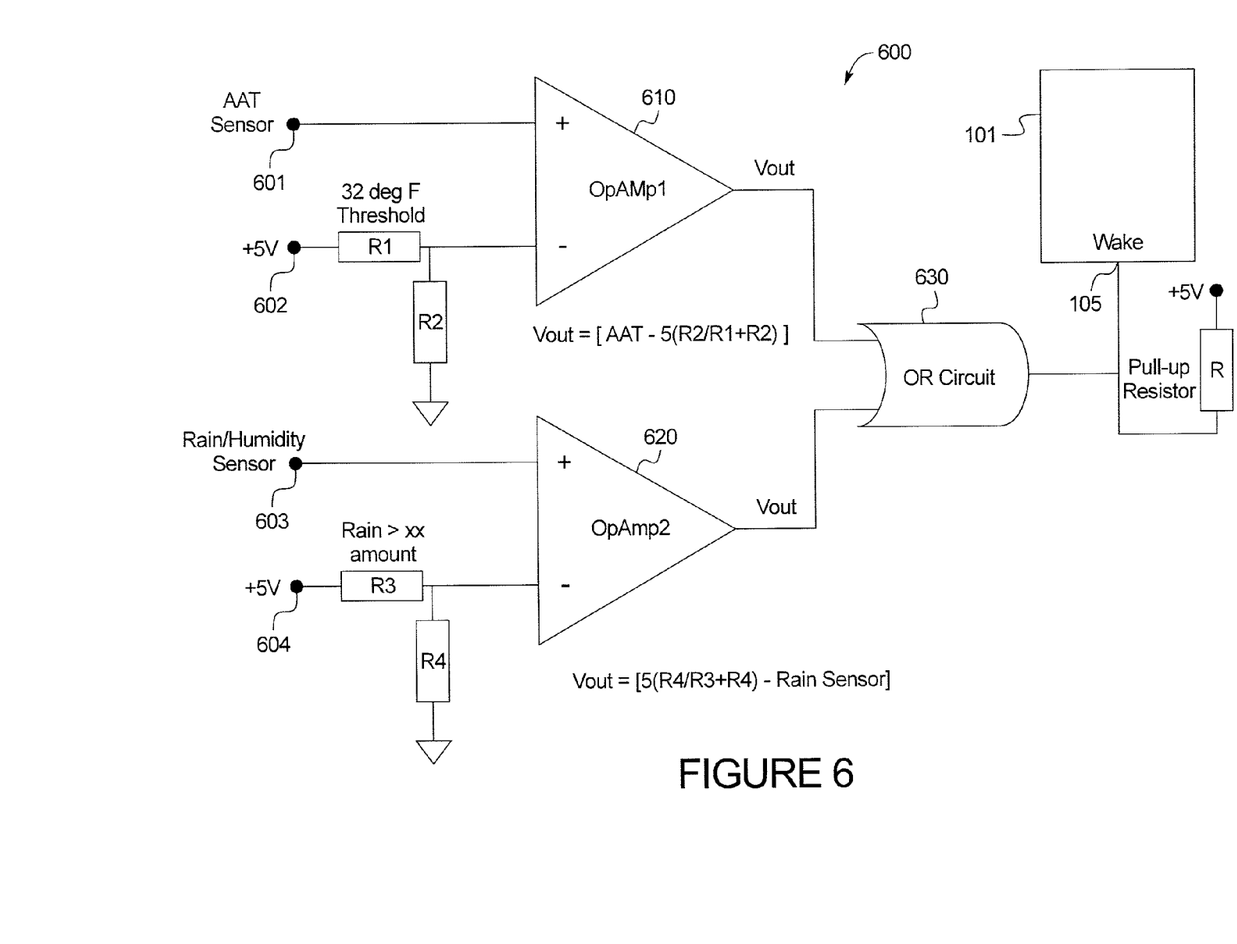
FIG. 6 illustrates a block diagram for an exemplary wake up circuit torque of the vehicle side window system, according to some embodiments.

FIG. 6 illustrates an exemplary wake up circuit 600 configured to detect a wake up condition for waking up control unit 101. The wake up circuit 600 is comprised of a first operational amplifier (Op Amp) 610, a second Op Amp 620, an OR logical circuit 630, and control unit 101. A first input 601 to the first Op Amp 610 is coupled to temperature sensor 111, and supplies temperature sensor readings sensed by temperature sensor 111 to a non-inverting input of the first Op Amp 610. A second input 602 to the first Op Amp 610 supplies a +5V voltage source to an inverting input of the first Op Amp 610, where the +5V voltage source is coupled to a first resistor R1 and the second resistor R2. The first resistor R1 and the second resistor R2 are chosen to correspond to a voltage of temperature sensor 111 that is equal or less than 32 degrees Fahrenheit. The voltage output for the first Op Amp 610 is Vout=[(Voltage from temperature sensor 111)−5*(R2/R1+R2)].

A third input 603 to the second Op Amp 620 is coupled to humidity sensor 112 in some embodiments and to precipitation sensor 113 in other embodiments. The third input 603 supplies humidity sensor readings sensed by humidity sensor 112, or precipitation sensor readings sensed by precipitation sensor 113, to a non-inverting input of the second Op Amp 620. A fourth input 604 supplies a +5V voltage source to an inverting input of the second Op Amp 620, where the +5V voltage source is coupled to a third resistor R3 and the fourth resistor R4. The third resistor R3 and the fourth resistor R4 are chosen to correspond to a voltage of humidity sensor 112 or a voltage of precipitation sensor 113 equal to a precipitation (e.g., rain or snow) amount greater than xx. The variable xx may, for example, represent a rain sensor signal 10% above a dry output, such that if dry weather output is equal to 0.0-5V, then the threshold may be 0.5V. The voltage output for the second Op Amp 620 is Vout=[5*(R4/R3+R4)−(Voltage from humidity sensor 112)] or Vout=[5*(R4/R3+R4)−(Voltage from precipitation sensor 113)].

When the ambient air temperature sensed by temperature sensor 111 is equal to, or less than, 32 degrees Fahrenheit, the first Op Amp 610 outputs 0 volts. Similarly, when the humidity sensor 112 or precipitation sensor 113 senses less than xx (e.g., 10%) amount of precipitation, the second Op Amp 620 outputs 0 volts. When both the first Op Amp 610 and the second Op Amp 620 output 0 volts, a voltage to the wake up pin 105 is also 0 volts which causes control unit 101 to wake up and begin the processes as described herein with reference to flow chart 200 and flow chart 300.

Any process descriptions or blocks in the figures, should be understood as representing modules, segments, or portions of code which include one or more executable instructions, executable by a computing device, processor, or controller (e.g., control unit 101), for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, are merely set forth for a clear understanding of the principles of this disclosure. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle comprising:
   a sensor configured to sense an environmental condition;
   a motor configured to move a window; and
   a control unit configured to:
      operate in an off state before receiving a wake up signal;
      receive the wake up signal enabling the control unit to receive sensor information from the sensor;
      receive the sensor information, the sensor information identifying an environmental condition sensed by the sensor;
      analyze the sensor information by comparing the environmental condition to an environmental condition limit;
      determine an ice breaking condition is satisfied when the environmental condition satisfies the environmental condition limit; and
      control the motor to rotate according to an ice breaking routine when the ice breaking condition is satisfied.

2. The vehicle of claim 1, wherein the sensor includes one or more of a temperature sensor configured to sense an ambient air temperature, a humidity sensor configured to sense a humidity level, and a precipitation sensor configured to sense a precipitation level.

3. The vehicle of claim 1, wherein the wake up signal is received from a vehicle key FOB.

4. The vehicle of claim 1, wherein the wake up signal is received to correspond to a predetermined time of day or a predetermined time interval.

5. The vehicle of claim 1, wherein the environmental condition is a temperature reading, and the environmental condition limit is a predetermined temperature; and
   wherein the control unit is configured to determine the ice breaking condition is satisfied when the temperature reading is less than the predetermined temperature.

6. The vehicle of claim 1, wherein the environmental condition is a humidity reading, and the environmental condition limit is a predetermined humidity; and
   wherein the control unit is configured to determine the ice breaking condition is satisfied when the humidity reading is less than the predetermined humidity.

7. The vehicle of claim 1, wherein the environmental condition is a precipitation reading, and the environmental condition limit is a predetermined precipitation; and wherein the control unit is configured to determine the ice breaking condition is satisfied when a temperature reading is greater than the predetermined precipitation.

8. The vehicle of claim 1, wherein the environmental condition is at least one of a temperature reading, a humidity reading, and a precipitation reading, and the environmental condition limit is at least one of a predetermined temperature, a predetermined humidity, and a predetermined precipitation; and wherein the control unit is configured to determine the ice breaking condition is satisfied when the at least one of the temperature reading, the humidity reading, and the precipitation reading satisfies the at least one of the predetermined temperature, the predetermined humidity, and the predetermined precipitation.

9. The vehicle of claim 1, wherein the control unit is further configured to:

monitor a motor current of the motor;

determine the motor current reaches a stall current during the ice breaking routine; and control the ice breaking routine to stop when the motor current is determined not to reach the stall current.

10. The vehicle of claim 1, wherein the control unit is further configured to:

monitor at least one of a motor voltage, a motor torque, and a motor speed;

determine the motor reaches at least one of a stall voltage, a stall torque, and a stall speed during the ice breaking routine; and control the ice breaking routine to stop when the motor is determined not to reach at least one of the stall voltage, the stall torque, and the stall speed.

11. The vehicle of claim 1, wherein the environmental condition is a precipitation reading, and the environmental condition limit is a predetermined precipitation; and wherein the control unit is configured to determine the ice breaking condition is satisfied when the temperature reading is greater than the predetermined precipitation.

12. A vehicle comprising:

a sensor configured to sense an environmental condition;

a motor configured to move a window; and a control unit configured to:

receive sensor information identifying the environmental condition from the sensor while the control unit is in an off state;

compare the environmental condition to an environmental condition limit;

determine an ice breaking condition is satisfied when the comparison is satisfied; and control an ice breaking routine based on the determination.

13. The vehicle of claim 12, wherein the control unit is configured to control the motor to rotate according to an ice breaking routine when the ice breaking condition is determined to be satisfied.

14. The vehicle of claim 12, wherein the environmental condition is a temperature reading, and the environmental condition limit is a predetermined temperature; and wherein the control unit is configured to determine the ice breaking condition is satisfied when the temperature reading is less than the predetermined temperature.

15. The vehicle of claim 12, wherein the environmental condition is a humidity reading, and the environmental condition limit is a predetermined humidity; and wherein the control unit is configured to determine the ice breaking condition is satisfied when the humidity reading is less than the predetermined humidity.

16. The vehicle of claim 12, wherein the environmental condition is at least one of a temperature reading, a humidity reading, and a precipitation reading, and the environmental condition limit is at least one of a predetermined temperature, a predetermined humidity, and a predetermined precipitation; and wherein the control unit is configured to determine the ice breaking condition is satisfied when the at least one of the temperature reading, the humidity reading, and the precipitation reading satisfies the at least one of the predetermined temperature, the predetermined humidity, and the predetermined precipitation.

17. The vehicle of claim 12, wherein the control unit is further configured to:

monitor at least one of a motor current, a motor voltage, a motor torque, and a motor speed;

determine the motor reaches at least one of a stall current, a stall voltage, a stall torque, and a stall speed during the ice breaking routine; and control the ice breaking routine to stop when the motor is determined not to reach at least one of the stall current, the stall voltage, the stall torque, and the stall speed.

* * * * *